United States Patent
Jiang et al.

(10) Patent No.: US 12,215,967 B2
(45) Date of Patent: Feb. 4, 2025

(54) LINE-SCANNING THREE-DIMENSIONAL SENSING SYSTEM

(71) Applicant: Hong Kong Applied Science and Technology Research Institute Company Limited, Hong Kong (CN)

(72) Inventors: Jinbo Jiang, Hong Kong (CN); Steaphan Si Fan Xie, Hong Kong (CN); Yong Chi, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 329 days.

(21) Appl. No.: 17/819,340

(22) Filed: Aug. 12, 2022

(65) Prior Publication Data

US 2024/0053140 A1 Feb. 15, 2024

(51) Int. Cl.
*G01B 11/25* (2006.01)
*G02B 27/09* (2006.01)

(52) U.S. Cl.
CPC .......... *G01B 11/25* (2013.01); *G02B 27/0955* (2013.01); *G02B 27/0988* (2013.01)

(58) Field of Classification Search
CPC .... G01B 11/25; G01B 2210/50; G01B 11/24; G02B 27/0955; G02B 27/0988
USPC .... 356/610, 614, 615, 624, 237.2, 604, 601, 356/300, 301, 622
See application file for complete search history.

(56) References Cited

U.S. PATENT DOCUMENTS

| | | | |
|---|---|---|---|
| 5,675,407 A | 10/1997 | Geng | |
| 7,936,464 B2 | 5/2011 | Keranen | |
| 8,654,352 B1 | 2/2014 | Deng et al. | |
| 9,410,880 B2* | 8/2016 | Zhao | G01N 21/47 |
| 11,041,799 B2* | 6/2021 | Haverkamp | G01J 3/46 |
| 2007/0007428 A1* | 1/2007 | Ri | G02B 21/0064 |
| | | | 250/201.3 |
| 2007/0241266 A1* | 10/2007 | Gweon | G02B 21/0032 |
| | | | 250/225 |

(Continued)

FOREIGN PATENT DOCUMENTS

| | | |
|---|---|---|
| CN | 108344695 A | 7/2018 |
| CN | 111220090 A | 6/2020 |

(Continued)

*Primary Examiner* — Isiaka O Akanbi
(74) *Attorney, Agent, or Firm* — S&F/WEHRW

(57) ABSTRACT

A line-scanning three-dimensional sensing system measures a surface profile of an object. In the system, a dispersion optical module (DOM) performs a forward optical process of chromatically dispersing a polychromatic linear light beam into constituent narrowband linear light beams (CNLLBs) and focusing the CNLLBs on different focal planes to form a rainbow light pattern for illuminating a scanned surface of the object. The illuminated object displays an information-bearing color image (IBCI) containing height information of the scanned surface. The DOM captures the IBCI, and performs a backward optical process of optically condensing the captured IBCI to form an elongated light pattern. The backward optical process is an inverse of the forward one. A slit spatially filters the elongated light pattern to form an output light line. A height profile of the scanned surface is obtained by analyzing a spectral content at each point of the output light line.

19 Claims, 13 Drawing Sheets

(56) References Cited

U.S. PATENT DOCUMENTS

| | | | |
|---|---|---|---|
| 2012/0105859 A1* | 5/2012 | Heo | G01B 11/24 |
| | | | 356/456 |
| 2014/0043619 A1* | 2/2014 | Deng | G01B 11/24 |
| | | | 356/601 |
| 2020/0141722 A1* | 5/2020 | Körner | G01B 11/2513 |
| 2020/0363619 A1* | 11/2020 | Nikitin | G02B 21/0064 |

FOREIGN PATENT DOCUMENTS

| | | |
|---|---|---|
| CN | 112648926 A | 4/2021 |
| CN | 113465547 A | 10/2021 |
| CN | 115060363 A | 9/2022 |
| DE | 102006007172 B4 | 1/2013 |
| WO | 2013064395 A1 | 5/2013 |

* cited by examiner

Region A
(enlarged)

Region B
(enlarged)

LINE-SCANNING THREE-DIMENSIONAL SENSING SYSTEM

LIST OF ABBREVIATIONS

2D Two-dimensional
3D Three-dimensional
CNLLB Constituent narrowband linear light beam
DOM Dispersion optical module
FOV Field of view
IBCI Information-bearing color image
LED Light emitting diode
NIR Near infrared
PLLB Polychromatic linear light beam
TIR Total internal reflection

FIELD OF THE INVENTION

The present invention generally relates to a line-scanning 3D sensing system for measuring a surface profile of an object. More particularly, the present invention relates to such system that chromatically disperses a PLLB into CNLLBs and focuses the CNLLBs on different heights above a reference surface to form a rainbow light pattern for surface profile measurement.

BACKGROUND

Nowadays, shiny surfaces, multi-layer transparent surfaces, precision electronic surfaces are currently the most complicated surfaces to be inspected, and almost become a bottle neck in the machine vision area. Products such as electronic components, semiconductor wafers, mobile phone cover glasses and metal automotive parts are always difficult to be inspected. It is noted that 2D machine vision cannot meet the demand, and therefore fast and accurate 3D measurement technologies are required. Line-scanning 3D sensing is the state-of-the-art technology for inspection of such kinds of surfaces.

Conventional line-scanning 3D sensing systems have problems in some situations. A tilting axis line-scanning 3D sensing system such as the one disclosed in U.S. Pat. No. 7,936,464 B2 suffers from the shadow problem. Smaller features behind bigger objects cannot be detected. In addition, deep holes and troughs cannot be measured. Systems using pinhole arrays or digital micro-mirrors device panels, such as the systems disclosed in US 2020/0363619 A1 and DE 102006007172 B4, are usable to measure deep holes and troughs. However, alignment is critical, resolution is limited by pinhole sizes, and crosstalk is a serious drawback. Systems using cylindrical lenses and diffractive elements, such as the one disclosed in U.S. Pat. No. 8,654,352 B1, also suffer from various problems. Since cylindrical lenses are used, the rotation tolerance during lens assembly is critical, leading to stringent requirements in lens alignment. The diffractive element also induces zero-order and higher-order diffraction noise.

There is a need in the art to develop a new line-scanning 3D sensing system that solves the above-mentioned shadow problem (such that deep holes and troughs can be measured) and at the same time makes the system easier for alignment.

SUMMARY OF THE INVENTION

A first aspect of the present invention is to provide a line-scanning 3D sensing system for measuring a surface profile of an object.

The system comprises a light source module, a first slit, a DOM and a second slit. The light source module is used for generating a polychromatic light beam. The first slit is used for spatially filtering the polychromatic light beam to form a PLLB. The DOM is configured to perform a forward optical process of chromatically dispersing the PLLB received from the first slit into CNLLBs and focusing the CNLLBs respectively on different focal planes to form a rainbow light pattern for illuminating a scanned surface of the object during surface profile measurement, whereby the illuminated object is caused to display an IBCI on the object. The IBCI contains height information of the scanned surface. The DOM is further configured to capture the IBCI, and to perform a backward optical process of optically condensing the captured IBCI to form an elongated light pattern. The backward optical process is an inverse of the forward optical process. The second slit is used for spatially filtering the elongated light pattern to form an output light line. A height profile of the scanned surface is obtainable by analyzing a spectral content at each point of the output light line such that the surface profile is determinable according to respective height profiles obtained for a plurality of scanned surfaces of the object.

Preferably, the DOM comprises first and second groups of lenses. The first group of lenses is aligned on a first optical axis. The first group of lenses is configured to chromatically disperse the PLLB into the CNLLBs and focus the CNLLBs respectively on the different focal planes distributed on the first optical axis over a predetermined length to form the rainbow light pattern. The second group of lenses is configured to optically condense the captured IBCI to form the elongated light pattern. The first and second groups of lenses share one or more commonly-shared lenses. At least one commonly-shared lens is used for simultaneously outputting the rainbow light pattern and inputting the IBCI. It thereby avoids a burden of aligning the first and second groups of lenses to output the rainbow light pattern and input the IBCI.

Preferably, the DOM further comprises a beam splitter optically coupled to the one or more commonly-shared lenses and positioned in the first group of lenses such that the captured IBCI is duplicated into two copies, one of which is directed towards the second slit.

Preferably, the second group of lenses includes one or more additional lenses not shared with the first group of lenses. The one or more additional lenses are disposed between the beam splitter and the second slit for optically processing the captured IBCI before the captured IBCI reaches the second slit. The one or more additional lenses are replicas of corresponding one or more lenses used in the first group of lenses for optically processing the PLLB and disposed between the beam splitter and the first slit.

In certain embodiments, the first slit is configured such that the PLLB emitted at any point on the first slit into the DOM has a first group of chief rays having an angle of divergence within 1° as measured from the first optical axis. Furthermore, the first group of lenses is configured such that the CNLLBs received at any point on the rainbow light pattern has a second group of chief rays having an angle of convergence within 1° as measured from the first optical axis. The system further comprises a platform for positioning the object during surface profile measurement. The platform comprises a reference plane on which the object is arranged to be positioned. In addition, the first group of lenses is oriented such that the first optical axis is perpendicular to the reference plane, causing the rainbow light pattern to be perpendicular to the reference plane to thereby allow the surface profile to be measured even if the scanned surface includes a trough.

In certain embodiments, the light source module is a color-mixing light source module comprising a light source and a color mixing rod. The light source is used for generating raw light rays that collectively provide polychromatic light. The color mixing rod is optically coupled to the first slit to provide the polychromatic light beam to the first slit for spatial filtering. The color mixing rod is shaped as an elongated slab for mixing the raw light rays to generate the polychromatic light beam such that at least a portion of the polychromatic light beam to be received by the first slit is substantially uniform in color.

In certain embodiments, the light source comprises one or more LEDs for collectively generating the raw light rays. In addition, the color-mixing light source module further comprises an asymmetric TIR lens for orienting the raw light rays generated from the one or more LEDs toward the color mixing rod. The asymmetric TIR lens has different lengths in x- and y-directions.

In certain embodiments, the light source comprises one or more LEDs each deposited with a sun spectrum phosphor padding, where the sun spectrum phosphor padding is formulated for generating a spectrum of light at least over a range of 400 nm to 700 nm. The one or more LEDs are arranged to optically excite the sun spectrum phosphor padding to generate the raw light rays that collectively provide the polychromatic light. Furthermore, the color mixing rod is optically coupled to the light source for directly receiving the raw light rays from the light source.

In certain embodiments, the system further comprises a grating, an imaging sensor, a collimating lens module and a condenser lens module. The grating is used for diffracting the output light line to thereby form a spectral image of the output light line. The imaging sensor is used for imaging the spectral image. The spectral content at each point of the output light line is determinable from the spectral image. The collimating lens module is positioned between the second slit and the grating for collimating the output light line before the output light line is diffracted by the grating. The condenser lens module is positioned between the grating and the imaging sensor for focusing the spectral image onto the imaging sensor.

In certain embodiments, the system further comprises a prism for reflecting the spectral image emitted from the grating to the condenser lens module. The prism is configured to redirect the spectral image such that the collimating lens module and the condenser lens module are oriented mutually perpendicularly to each other to thereby enable convenient alignment and assembling of the collimating lens module and the condenser lens module.

In certain embodiments, the system further comprises a third slit and a 2D line-scanning camera. The third slit is used for spatially filtering a copy of the elongated light pattern received at the third slit to form a second output light line. The 2D line-scanning camera is used for imaging the second output light line in color, whereby a 2D image of the object is obtainable after the plurality of scanned surfaces is scanned for 3D sensing. In addition, the DOM further comprises a first beam splitter and a second beam splitter. The first beam splitter is positioned in the first group of lenses such that the captured IBCI is duplicated into two copies, one of which is directed towards the second slit. The second beam splitter is positioned in the first group of lenses such that the captured IBCI is duplicated into two copies, one of which is directed towards the third slit.

A second aspect of the present invention is to provide another line-scanning 3D sensing system for measuring a surface profile of an object.

The system comprises a light source module, a first slit, a first DOM, a second DOM, a bi-passed lens module and a second slit. The light source module is used for generating a polychromatic light beam. The first slit is optically coupled to the light source module for spatially filtering the polychromatic light beam to form a PLLB. The first DOM is configured to perform a forward optical process of chromatically dispersing the PLLB received from the first slit into CNLLBs and focusing the CNLLBs on different focal planes to form a rainbow light pattern. The rainbow light pattern is used for illuminating a scanned surface of the object during surface profile measurement so as to cause the illuminated object to display an IBCI on the object. The IBCI contains height information of the scanned surface. The second DOM is configured to capture the IBCI and to perform a backward optical process of optically condensing the captured IBCI to an elongated light pattern. The backward optical process is an inverse of the forward optical process. The first and second DOMs are positioned side by side. The bi-passed lens module is configured to reposition the rainbow light pattern generated by the first DOM to an offset position at which the object is arranged to position, and to direct the IBCI from the offset position to the second DOM for enabling the second DOM to capture the IBCI. The second slit is used for spatially filtering the elongated light pattern to form an output light line. A height profile of the scanned surface is obtainable by analyzing a spectral content at each point of the output light line such that the surface profile is determinable according to respective height profiles obtained for a plurality of scanned surfaces of the object.

Preferably, the first DOM comprises a first plurality of lenses, and the second DOM comprises a second plurality of lenses. The second plurality of lenses is a replica of the first plurality of lenses.

In certain embodiments, the second DOM further comprises a reflector positioned in the second plurality of lenses.

In certain embodiments, the light source module is a color-mixing light source module comprising a light source and a color mixing rod. The light source is used for generating raw light rays that collectively provide polychromatic light. The color mixing rod is optically coupled to the first slit to provide the polychromatic light beam to the first slit for spatial filtering. The color mixing rod is shaped as an elongated slab for mixing the raw light rays to generate the polychromatic light beam such that at least a portion of the polychromatic light beam to be received by the first slit is substantially uniform in color.

In certain embodiments, the light source comprises one or more LEDs for collectively generating the raw light rays. In addition, the color-mixing light source module further comprises an asymmetric TIR lens for mixing the raw light rays generated from the one or more LEDs to form an intermediate light output such that the intermediate light output is substantially uniform in radiation power. The raw light rays in the intermediate light output are fed to the color mixing rod. Furthermore, the asymmetric TIR lens has different lengths in x- and y-directions.

In certain embodiments, the light source comprises one or more LEDs each deposited with a sun spectrum phosphor padding, where the sun spectrum phosphor padding is formulated for generating a spectrum of light at least over a range of 400 nm to 700 nm. The one or more LEDs are arranged to optically excite the sun spectrum phosphor padding to generate the raw light rays that collectively provide the polychromatic light. In addition, the color mixing rod is optically coupled to the light source for directly receiving the raw light rays from the light source.

In certain embodiments, the system further comprises a grating, an imaging sensor, a collimating lens module and a condenser lens module. The grating is used for diffracting the output light line to thereby form a spectral image of the output light line. The imaging sensor is used for imaging the spectral image. The spectral content at each point of the output light line is determinable from the spectral image. The collimating lens module is positioned between the second slit and the grating for collimating the output light line before the output light line is diffracted by the grating. The condenser lens module is positioned between the grating and the imaging sensor for focusing the spectral image onto the imaging sensor.

Other aspects of the present disclosure are disclosed as illustrated by the embodiments hereinafter.

Figure 1:
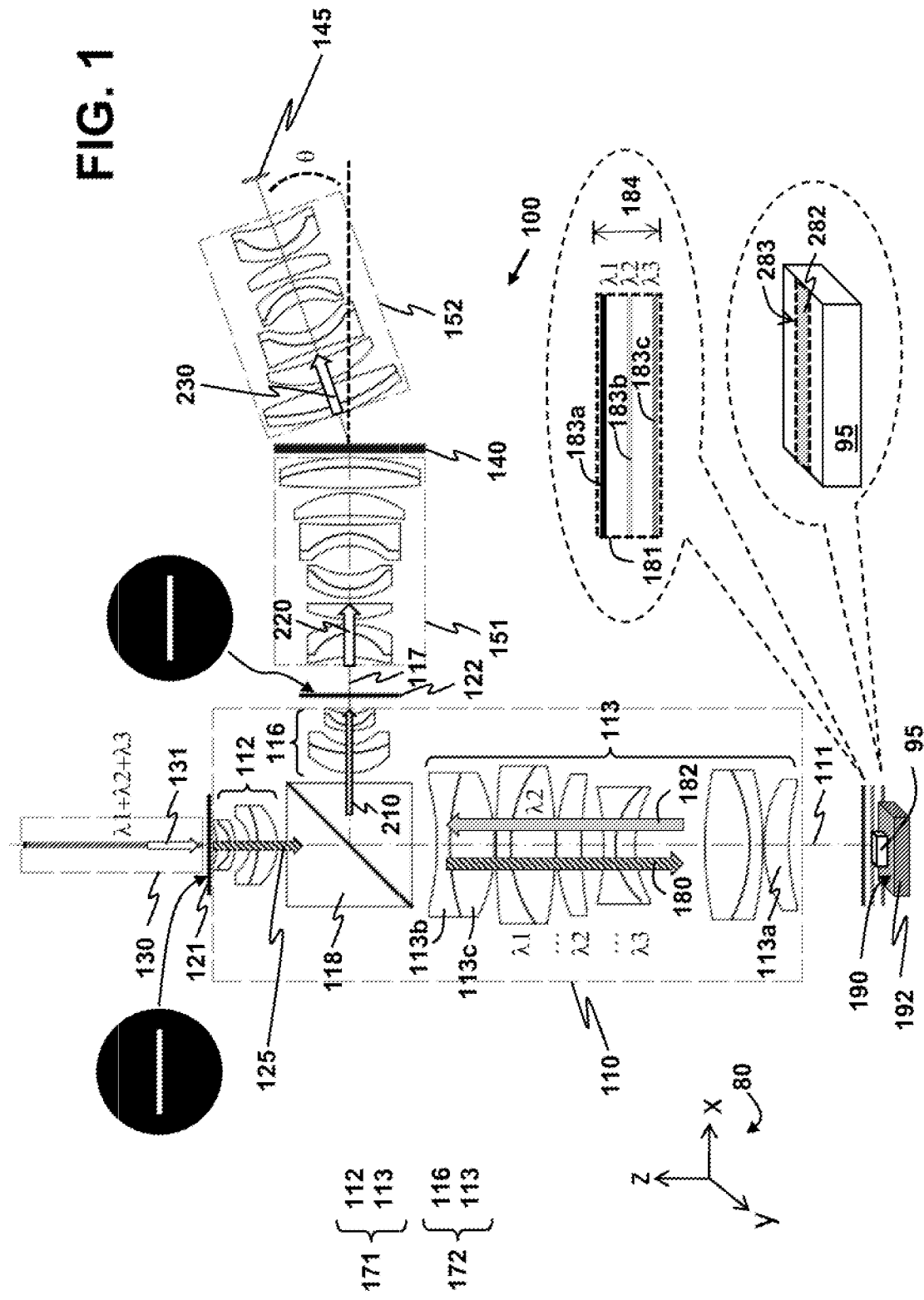
FIG. 1 depicts a first line-scanning 3D sensing system for measuring a surface profile of an object, where the first system uses a DOM: to generate a rainbow light pattern from a PLLB for illuminating the object on a scanned surface such that an IBCI is displayed on the object; and to optically condense the captured IBCI to an elongated light pattern, which is subsequently filtered by a second slit to yield an output light line with a spectral content indicating a height profile of the scanned surface.

Skilled artisans will appreciate that elements in the figures are illustrated for simplicity and clarity and have not necessarily been depicted to scale.

DETAILED DESCRIPTION

Herein in the specification and appended claims, a spectral content or a wavelength spectrum of a light beam defines "a color" of the light beam. The spectrum may have one or more wavelengths. If the light beam is visible, one can easily understand the meaning of color. For example, a red color corresponds to a wavelength of around 700 nm. In another example, a light beam having a wavelength spectrum uniformly distributed over a visible range of 400 nm to 700 nm is generally considered to have a white color. The aforementioned definition of color extends the concept of color to invisible light. An invisible light beam, such as a NIR light beam, possesses a color that corresponds to the wavelength content in the NIR light beam. Furthermore, two invisible light beams having different wavelengths are herein considered to have different colors, though the two light beams are invisible to people.

As used herein, "a polychromatic light beam" is a light beam having a spectrum composed of plural wavelengths. The spectrum may be a discrete one, a continuous one, or a mixture thereof. The polychromatic light beam is a superposition of, or is decomposable into, plural constituent narrowband light beams each having a spectrum substantially narrower than the spectrum of the polychromatic light beam, where respective spectra of the constituent narrowband light beams are substantially non-overlapping from each other. Each constituent narrowband light beam may be visible or invisible, depending on the wavelength content thereof. It is possible that each constituent narrowband light beam is a monochromatic light beam, a light beam that is practically considered by those skilled in the art to have a single wavelength.

As used herein, "chromatic dispersion" of a polychromatic light beam means decomposing the polychromatic light beam into its constituent narrowband light beams and spatially separating the constituent narrowband light beams. For instance, the constituent narrowband light beams are spatially separated if the constituent narrowband light beams are respectively directed along different propagation directions. To realize chromatic dispersion of the polychromatic light beam, one may use a lens or a prism that exhibits different refractive indexes to narrowband light beams that have different wavelength contents.

As used herein, "a linear light beam" is a light beam whose cross-section has a shape of a straight line, where the cross-section is perpendicular to the light beam's propagation direction. The boundary of the cross-section may be sharp or blurred.

As used herein, "a bi-passed lens" is a lens used in both forward and backward light paths where the forward and backward light paths have traveling directions opposite to each other.

As used herein, "a bi-passed lens module" is an optical module consisting of one or more lenses each of which is a bi-passed lens.

As used herein, "a focal plane" is a plane perpendicular to an optical axis that contains a focal point.

Herein in the specification and appended claims, "an inverse" of an optical process is interpreted substantially similar to an inverse of a mathematical function. If the optical process is represented by a transformation rule for transforming a first light beam into a second light beam, the inverse of the optical process is represented by another transformation rule for transforming the second light beam to the first light beam.

Disclosed herein are embodiments of a line-scanning 3D sensing system for measuring a surface profile of an object. Basically, the line-scanning 3D sensing system uses a spatial distribution of focused linear light beams with different colors to illuminate the object so as to form a color image on the object where the height information of the object is encoded into the color image through a spatial distribution of color on the color image. In particular, the spatial distribution of focused linear light beams forms a rainbow light pattern in a form of planar light sheet. Hence, every time a line or a strip on the surface of the object is scanned, so that line-scanning is performed. By performing line-scanning for multiple times over different strips of object surface, the surface profile of the object is measured.

FIG. 1 depicts a first line-scanning 3D sensing system 100 (shorthanded as a first system 100) for measuring a surface profile of an object 95 in accordance with certain embodiments of the disclosed line-scanning 3D sensing system.

In FIG. 1, a reference frame 80, which defines x-, y- and z-directions along with x-, y- and z-axes, is shown. The reference frame 80 is used herein for assisting illustration of different parts or components in various embodiments of the disclosed line-scanning 3D sensing system.

Exemplarily, the first system 100 comprises a light source module 130, a first slit 121, a DOM 110 and a second slit 122.

The light source module 130 is used for generating a polychromatic light beam 131. The polychromatic light beam 131 is subsequently used for generating a spatial distribution of focused linear light beams with different colors for illuminating the object 95. It is desirable that the polychromatic light beam 131 is spatially uniform in radiation power and in color over a cross-section of the polychromatic light beam 131. Although it is practical to maintain substantial uniformity in color and in power over a central region of the cross-section, it is often difficult or costly to extend this uniformity to a periphery of the cross-section.

Advantageously, the first slit 121 is optically coupled to the light source module 130 and is used for spatially filtering the polychromatic light beam 131 to form a PLLB 125. The first slit 121 is positioned with respect to the light source module 130 such that a peripheral portion of the polychromatic light beam 131 emitted from the light source module 130 is filtered off. It thereby produces the PLLB 125 that is substantially uniform in radiation power and in color.

The DOM 110 is used to receive the PLLB 125 from the first slit 121 as an input, and to output a rainbow light pattern 181 to illuminate the object 95 for surface profile measurement. In particular, the DOM 110 is configured to chromatically disperse the PLLB 125 into CNLLBs 180 (represented by $\lambda 1$, $\lambda 2$ and $\lambda 3$ in FIG. 1) and focus the CNLLBs 180 respectively on different focal planes (represented by different lines 183a-c of $\lambda 1$, $\lambda 2$ and $\lambda 3$, and distributed along the z-direction in FIG. 1) outside the DOM 110 to form the rainbow light pattern 181, which displays a range of different colors. Since the CNLLBs 180 are linear light beams, the rainbow light pattern 181, which is composed of the CNLLBs 180 at focused positions 183a-c, is a planar light sheet localized on the x-z plane and having a predetermined length 184 along the z-direction. The object 95 is illuminated by the rainbow light pattern 181 on a scanned surface 283 of the object 95. The scanned surface 283 is a surface under scanning. The scanned surface 283 is an elongated strip of an outer surface of the object 95, and hence line-scanning of the object 95 is achieved. When the object 95 is illuminated by the rainbow light pattern 181, the illuminated object 95 displays an IBCI 282 on the object 95. The IBCI 282 contains height information of the scanned surface 283. Specifically, the height information is encoded in the color distribution of the IBCI 282. Note that the predetermined length 184 of the rainbow light pattern 181 determines a maximum measurable variation of the object 95 in height.

Since the IBCI 282 is displayed on the outer surface of the object 95, most often this color image is not a planar one. Directly using a 2D imaging sensor to capture the IBCI 282 displayed on the object 95 to obtain the color distribution of the IBCI 282 requires positioning the 2D imaging sensor directly over the object 95 along the z-axis; otherwise, some information on the color distribution would be lost, e.g., if the object 95 has a deep hole. However, positioning the 2D imaging sensor directly above the object 95 is impractical.

Figure 2:
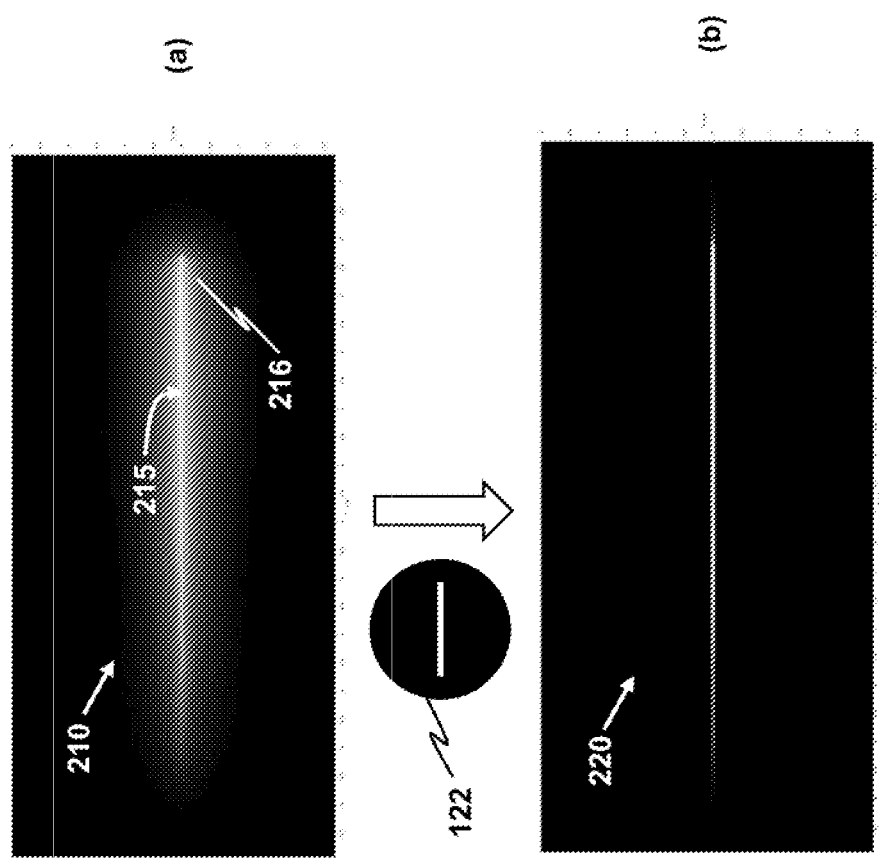
FIG. 2 depicts pictures of the elongated light pattern in subplot (a) and the output light line in subplot (b), indicating the filtering effect achieved by the second slit.

Instead of directly imaging the IBCI 282, the DOM 110 is arranged to capture the IBCI (represented by $\lambda 2$ in FIG. 1 and referenced as 182) from an overhead position, and to transmit the captured IBCI 182 through the DOM 110 to elsewhere. In particular, the displayed IBCI 282 (namely, the IBCI 282 displayed on the object 95) is received by the DOM 110 through the same outlet that outputs the rainbow light pattern 181. Note that the PLLB 125 and CNLLBs 180 travel along the DOM 110 in a direction opposite to a traveling direction of the captured IBCI 182. It follows that while the PLLB 125 is processed with a forward optical process of chromatically dispersing the PLLB 125 into the CNLLBs 180 and focusing the CNLLBs 180 respectively onto the different focal planes 183a-c, the captured IBCI 182 undergoes a backward optical process that is an inverse of the forward optical process. Since the displayed IBCI 282 may be regarded as a remnant of the rainbow light pattern 181 on the object 95, the backward optical process is expected to transform the captured IBCI 182 to a linear line segment (corresponding to the PLLB 125 in the forward optical process.) Subplot (a) of FIG. 2 depicts a diagram showing a simulation result that an elongated light pattern 210 is obtained by processing the captured IBCI 182 with the backward optical process. As a result, the DOM 110 optically condenses the captured IBCI 182 to form the elongated light pattern 210.

Different from the PLLB 125, which normally appears as a sharp light line, the elongated light pattern 210, though it contains a main central line 215, has some surrounding light signals 216 around the main central line 215. The main central line 215 is contributed from the rainbow light pattern 181 intersecting with the object 95, and contains height information of the scanned surface 283 of the object 95. Since the rainbow light pattern 181 is formed by the CNLLBs 180 at the focused positions 183a-c, stray light rays of out-of-focus CNLLBs are also present around the rainbow light pattern 181. It is believed that the surrounding light signals 216 are due to reflection of the stray light rays from the object 95, so that the surrounding light signals 216 are regarded as noise.

To retrieve the main central line 215 from the elongated light pattern 210 while removing the surrounding light signals 216, the second slit 122 is used for spatially filtering the elongated light pattern 210 to form an output light line 220. As a demonstration, subplot (b) of FIG. 2 depicts a diagram showing the output light line 220 obtained by masking the elongated light pattern 210 with the second slit 122. The output light line 220 is usable to obtain a height profile of the scanned surface 283 of the object 95. The height profile is obtainable by analyzing a spectral content at each point of the output light line 220. The surface profile of the object 95 is determinable according to respective height profiles obtained for a plurality of scanned surfaces of the object 95.

Preferably, the forward and backward optical processes are realized by a plurality of lenses 112, 113, 116 in the DOM 110. Particularly, the DOM 110 comprises a first group of lenses 171 and a second group of lenses 172, where lenses in these two groups are selected from the plurality of lenses 112, 113, 116. As shown in FIG. 1, the first lens group 171 consists of lenses 112, 113 while the second lens group 172 consists of lenses 113, 116. Note that the first and second lens groups 171, 172 share one or more lenses (referred to as commonly-shared lenses 113). The lenses 112, 113 of the first lens group 171 are aligned on a first optical axis 111. The first lens group 171 is configured to chromatically disperse the PLLB 125 into the CNLLBs 180 and focus the CNLLBs 180 respectively on the focal planes 183a-c distributed on the first optical axis 111 over the predetermined length 184 to form the rainbow light pattern 181. The second lens group 172 is configured to optically condense the captured IBCI 182 to the elongated light pattern 210. Advantageously, one or more of the commonly-shared lenses 113 are used for simultaneously outputting the rainbow light pattern 181 and inputting the displayed IBCI 282 (namely, lens 113a shown in FIG. 1). It thereby avoids a burden of aligning the first and second lens groups 171, 172 to output the rainbow light pattern 181 and input the displayed IBCI 282.

Since both the CNLLBs 180 and the captured IBCI 182 travel in the commonly-shared lenses 113, it is required to separate the captured IBCI 182 from the CNLLBs 180 before the captured IBCI 182 (which becomes the elongated light pattern 210) reaches the second slit 122. As such, the DOM 110 further comprises a beam splitter 118 optically coupled to the commonly-shared lenses 113 and positioned in the first lens group 171 such that the captured IBCI 182 traveling in the commonly-shared lenses 113 is duplicated into two copies, one of which is directed towards the second slit 122.

Due to the inclusion of the beam splitter 118 in the first lens group 171, the captured IBCI 182 travels on a pathway along the lenses 116 of the second lens group 172 whereas the PLLB 125 travels on another pathway along the lenses 112 of the first lens group 171. Since the forward optical process for processing the PLLB 125 is an inverse of the backward optical process for processing the captured IBCI 182, the lenses 116 (referred to as additional lenses 116 for convenience) disposed between the beam splitter 118 and the second slit 122 may be selected to be replicas of the lenses 112 (referred to as corresponding lenses 112) disposed between the beam splitter 118 and the first slit 121. Note that while the corresponding lenses 112 are aligned to the first optical axis 111, the additional lenses 116 are aligned to a second optical axis 117 perpendicular to the first optical axis 111.

As mentioned above, one advantage of the DOM 110 is that the burden of aligning the first and second lens groups 171, 172 to output the rainbow light pattern 181 and input the displayed IBCI 282 is avoided. Furthermore, lenses in the plurality of lenses 112, 113, 116 are preferred to be circular lenses, and needs not be cylindrical ones as used in U.S. Pat. No. 8,654,352 B1, thereby avoiding a requirement for aligning cylindrical lenses in the DOM 110. The DOM 110 is only required to align the first slit 121 to the first optical axis 111 and the second slit 122 to the second optical axis 117. A manufacturing cost of the DOM 110 is thus reduced.

In practical realizations of the first system 100, a platform 192 is often used to position the object 95 during surface profile measurement. The platform 192 comprises a reference plane 190 on which the object 95 is arranged to be positioned. The reference plane 190 is a planar surface and acts as a reference for measuring the height profile of the object 95. In the first system 100, the first lens group 171 is oriented such that the first optical axis 111 is perpendicular to the reference plane 190. It causes the rainbow light pattern 181 to be perpendicular to the reference plane 190. Advantageously, it allows the surface profile to be measured even if the scanned surface 283 of the object 95 includes a trough or a deep hole, provided that the CNLLBs 180 arrived at the rainbow light pattern 181 have propagation directions that are nearly parallel such that different colors of the CNLLBs 180 can propagate into the trough or deep hole for making measurement.

Figure 11:
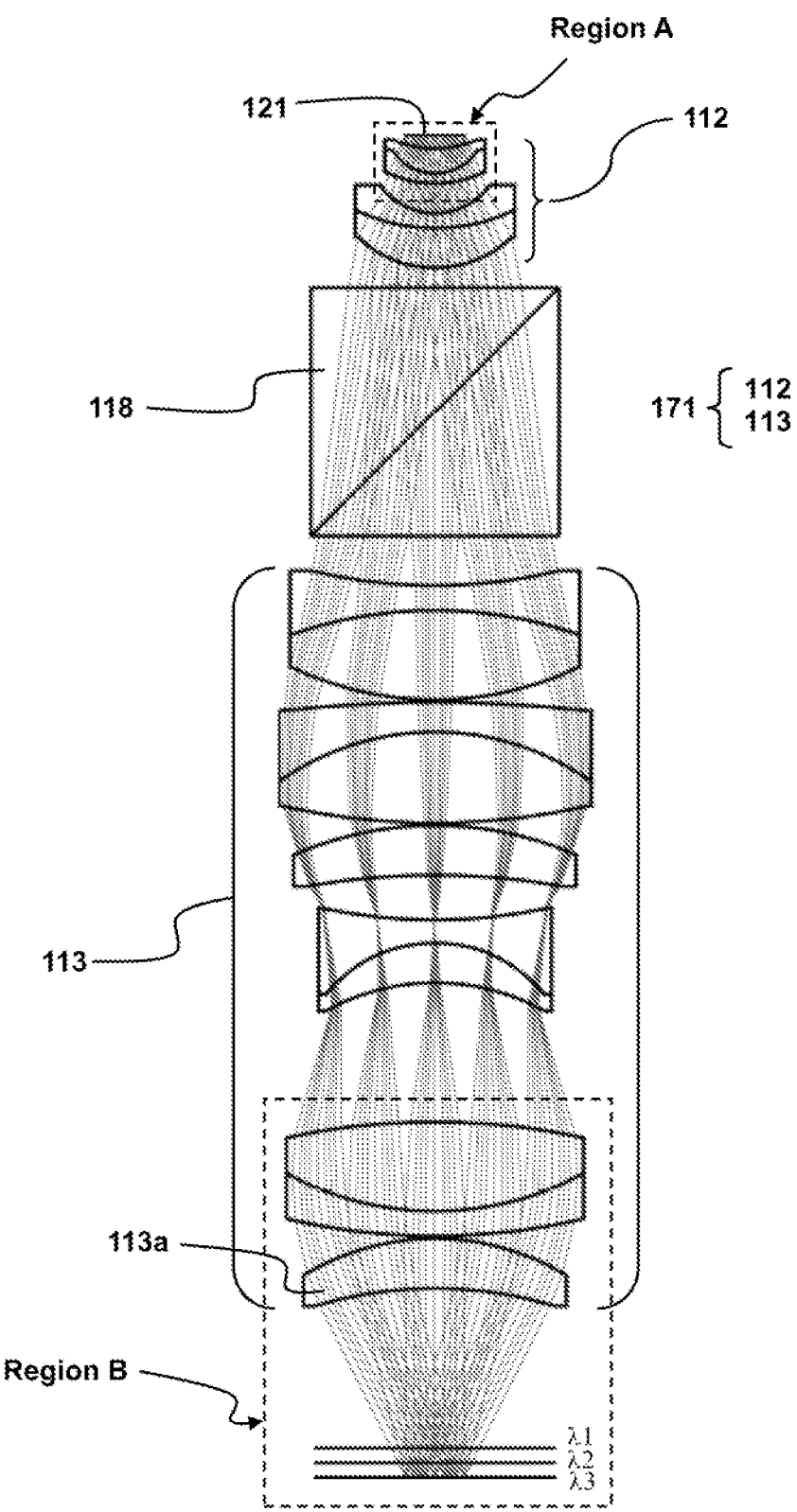
FIG. 11 depicts a ray-tracing diagram showing propagation of constituent light rays in and around the DOM used in the first line-scanning 3D sensing system.
Figure 11:
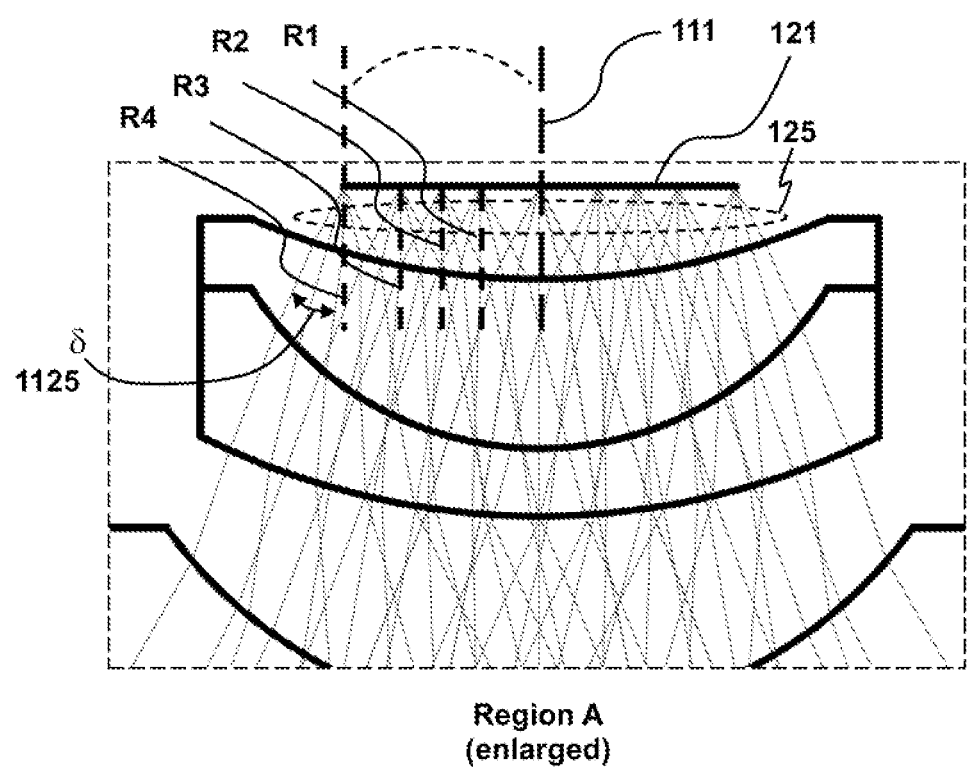
Figure 11:
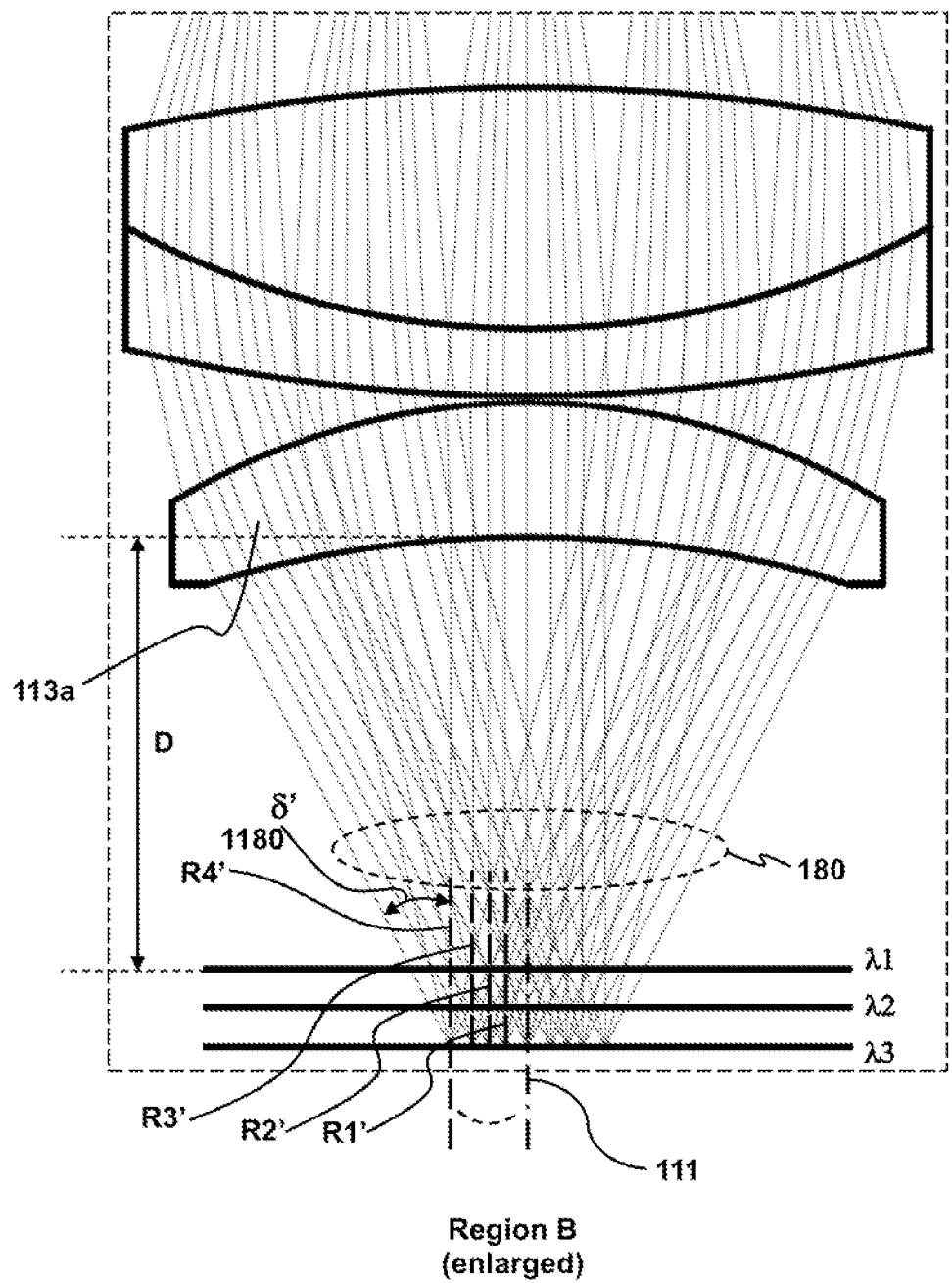

Provision of the CNLLBs 180 with nearly parallel propagation directions at the rainbow light pattern 181 is illustrated with the aid of FIG. 11. FIG. 11 depicts a ray-tracing diagram showing propagation of constituent light rays of the PLLB 125 and the CNLLBs 180 in and around the DOM 110. The ray-tracing diagram has Region A and Region B for showing light-ray propagation of the PLLB 125 around the first slit 121 and of the CNLLBs 180 nearby the rainbow light pattern 181, respectively. FIG. 11 also includes enlarged diagrams of Regions A and B for showing details therein.

To have the CNLLBs 180 nearly parallel in propagation direction, it is desirable to first control propagation directions of light rays that constitute the PLLB 125. The first slit 121 may be divided into many points. The PLLB 125 emitted at each point has a FOV formed with a cone of light rays. The cone of light rays is composed of a group of chief light rays and another group of remaining weaker light rays, where the group of chief light rays possesses a dominant portion of total light energy provided by the cone of light rays. As used herein, a group of chief light rays in a cone of light rays is defined such that the group of chief light rays bears 90% of the total light energy provided by the cone of light rays. Preferably, the PLLB 125 emitted at any point on the first slit 121 into the DOM 110 has a first group of chief rays (e.g., any one group of R1-R4) having an angle of divergence $\delta$ 1125 within 1° as measured from the first optical axis 111. It follows that the PLLB 125 is almost collimated over the entire first slit 121 with the angle of divergence $\delta$ 1125 at any point of the first slit 121 bounded by 1°. Note that the first slit 121 may be configured to function as a collimator for collimating the polychromatic light beam 131 in forming the PLLB 125. For example, the first slit 121 is formed as a long channel for guiding and limiting the propagation direction of the PLLB 125.

The PLLB 125 is processed by the first group of lenses 171 to form the CNLLBs 180, which subsequently form the rainbow light pattern 181. Given that the angle of divergence $\delta$ 1125 for the PLLB 125 is within 1°, it is preferable that the CNLLBs 180 received at any point on the rainbow light pattern 181 has a second group of chief rays (e.g., any one group of R1'-R4') having an angle of convergence $\delta'$ 1180 within 1° as measured from the first optical axis 111. Thereby, the rainbow light pattern 181 is capable of measuring troughs or deep holes, if any, located on the object 95 without the shadow problem. Keeping the angle of convergence δ' 1180 to be within 1° is achievable by a suitable configuration of the first group of lenses 171 in the DOM 110. In one embodiment, the first group of lenses 171 is configured to have overall focal lengths for different colors of light to be very long (like a telescope), causing the CNLLBs 180 to leave the DOM 110 with propagation directions approximately parallel to the first optical axis 111.

As mentioned above, the predetermined length 184 of the rainbow light pattern 181 determines the maximum measurable variation of the object 95 in height. In one design of the first system 100, the predetermined length 184 is 6 mm for a wavelength spectrum spanning from 400 nm to 700 nm (i.e. the whole visible spectrum). The rainbow light pattern 181 is localized above the reference plane 190 such that the working distance measurable by the rainbow light pattern 181 (denoted as D as shown in FIG. 11) is between 32 mm (at λ1 of wavelength 400 nm) and 38 mm (at λ3 of wavelength 700 nm). Angles of chief rays measured from the first optical axis 111 are less than 1° at the first slit 121 and at the object 95 so that the shadow problem is not present and the first system 100 can measure deep holes or troughs. The image space numerical aperture is 0.45 so that the first system 100 can measure a surface with a tilting angle greater than 22°. In said design of the first system 100, the plurality of lenses 112, 113, 116 in the DOM 110 includes at least one dispersion lens pair (e.g., lenses 113*b*, 113*c*) for chromatically dispersing the PLLB 125.

Other implementation details of the first system 100 are elaborated as follows.

In certain embodiments, the light source module 130 is a color-mixing light source module configured to mix raw light rays of different colors to form the polychromatic light beam 131. As mentioned above, it is desirable that the polychromatic light beam 131 is spatially uniform in power and in color over a cross-section of the polychromatic light beam 131.

Figure 3:
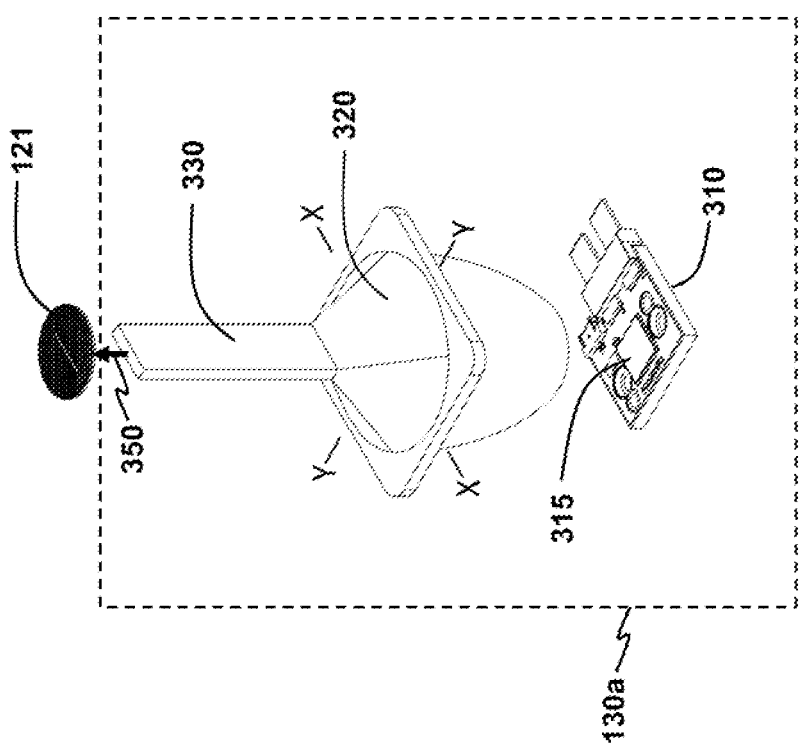
FIG. 3 depicts an exploded view of a first color-mixing light source module used in the first system.
Figure 4:
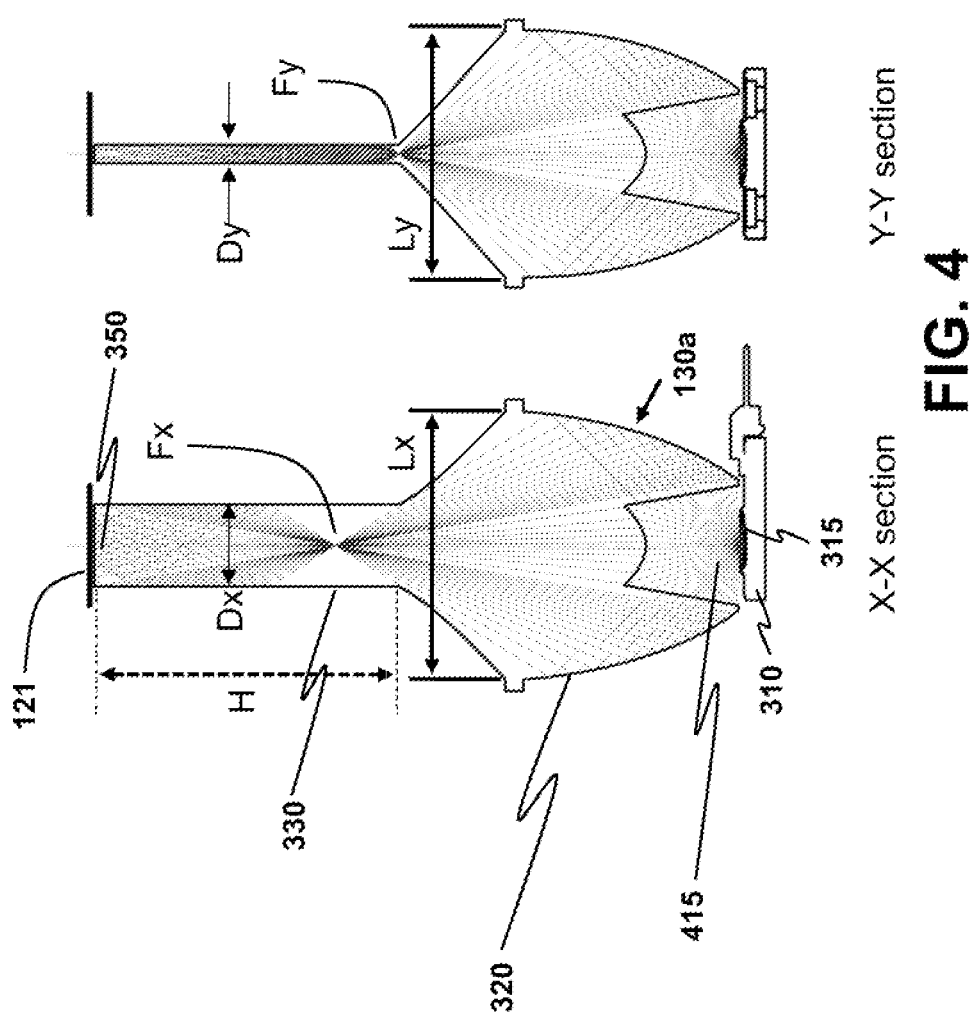
FIG. 4 depicts two cross-sectional views of the first color-mixing light source module in x-x section and in y-y section.

FIG. 3 depicts an exploded view of a first color-mixing light source module 130*a* as a first embodiment of the light source module 130. FIG. 4 depicts two cross-sectional views of the first color-mixing light source module 130*a* in x-x section and in y-y section as a demonstration of light-ray mixing in the light source module 103*a*. The first color-mixing light source module 130*a* comprises a light source 310, an asymmetric TIR lens 320 and a color mixing rod 330.

The light source 310 is used for generating raw light rays 415 that collectively provide polychromatic light. Usually, the light source 310 comprises one or more LEDs 315 for collectively generating the raw light rays 415, although other kinds of light emitters may be used. In certain embodiments, the one or more LEDs 315 include a large-area high-power LED (with a size greater than 3 mm in LED width).

The color mixing rod 330 is optically coupled to the first slit 121 to provide the polychromatic light beam (referenced as 350) to the first slit 121 for spatial filtering. The color mixing rod 330 is shaped as an elongated slab for mixing the raw light rays 415 to generate the polychromatic light beam 350 such that at least a portion of the polychromatic light beam 350 to be received by the first slit 121 is substantially uniform in color.

The asymmetric TIR lens 320 is located between the light source 310 and the color mixing rod 330. Functionally, the asymmetric TIR lens 320 is used for orienting the raw light rays 415 generated from the one or more LEDs 315 toward the color mixing rod 330. TIR is employed by the asymmetric TIR lens 320 for orienting and efficiently transmitting the raw light rays 415 to the color mixing rod 330. Since the color mixing rod 330 is shaped as a slab, the asymmetric TIR lens 320 has an asymmetric shape with different lengths in x- and y-directions.

The Inventors have identified the following design parameters of the asymmetric TIR lens 320 and color mixing rod 330 for efficiently delivering the raw light rays 415 from the light source 310 to the color mixing rod 330: (a) Lx>Ly where Lx and Ly are diameters of the asymmetric TIR lens 320 in x-direction and y-direction, respectively; (b) Fx higher than Fy where Fx and Fy are focal points of the asymmetric TIR lens 320 in x-direction and y-direction, respectively; (c) Dx>10 mm and Dy<2.5 mm where Dx and Dy are lengths of the color mixing rod 330 in x-direction and y-direction, respectively; and H>3×Dx where H is the height of the color mixing rod 330.

Figure 5:
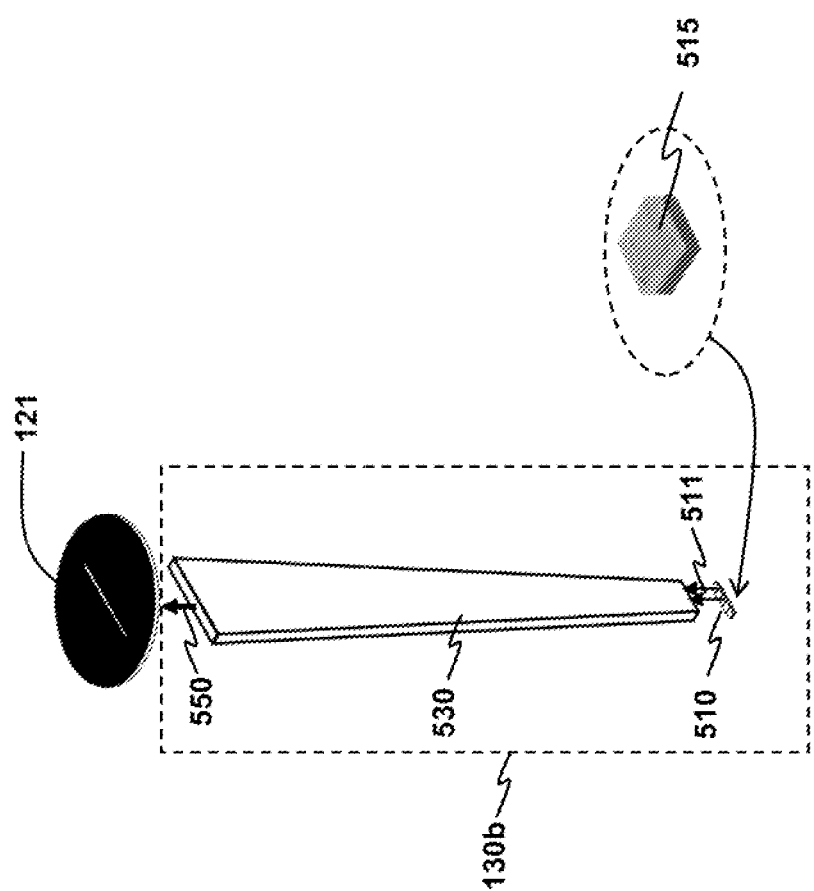
FIG. 5 depicts an exploded view of a second color-mixing light source module.

FIG. 5 depicts an exploded view of a second color-mixing light source module 130*b* as a second embodiment of the light source module 130. The second color-mixing light source module 130*b* comprises a light source 510 and a color mixing rod 530.

The light source 510 is used for generating raw light rays 511 that collectively provide polychromatic light. The light source 510 comprises one or more LEDs (e.g. LED 515) for collectively generating the raw light rays 511. An individual LED 515 is incorporated with a sun spectrum phosphor padding. The sun spectrum phosphor padding is formulated for generating a spectrum of light at least over a visible spectrum of 400 nm to 700 nm. The individual LED 515 is arranged to optically excite the sun spectrum phosphor padding such that the one or more LEDs generate the raw light rays 511 that collectively provide the polychromatic light.

The color mixing rod 530 is optically coupled to the first slit 121 to provide the polychromatic light beam (referenced as 550) to the first slit 121 for spatial filtering. The color mixing rod 530 is shaped as an elongated slab for mixing the raw light rays 511 to generate the polychromatic light beam 550 such that at least a portion of the polychromatic light beam 550 to be received by the first slit 121 is substantially uniform in color. Different from the first color-mixing light source module 130*a*, the color mixing rod 530 of the second color-mixing light source module 130*b* is optically coupled to the light source 510 for directly receiving the raw light rays 511 from the light source 510.

As mentioned above, the height profile is obtainable by analyzing a spectral content at each point of the output light line 220. Refer to FIG. 1. For obtaining the spectral content, the first system 100 may further comprise a grating 140 and an imaging sensor 145. The grating 140 is used for diffracting the output light line 220 to thereby form a spectral image 230 of the output light line 220. The spectral image 230 is obtained as a first-order diffraction pattern of the output light line 220. Denote θ as the angle of observing the first-order diffraction pattern, where θ is measured with respect to the second optical axis 117. The imaging sensor 145 is a 2D imaging sensor used for imaging the spectral image 230. The imaging sensor 145 is positioned at an orientation of θ with respect to the second optical axis 117 for imaging the first-order diffraction pattern, which is the spectral image 230. The spectral content at each point of the output light line 220 is determinable from the spectral image 230. The first system 100 may further comprise a collimating lens module 151 and a condenser lens module 152. The collimating lens module 151 is positioned between the second slit 122 and the grating 140 for collimating the output light line 220 before the output light line 220 is diffracted by the grating 140. The condenser lens module 152 is positioned between the grating 140 and the imaging sensor 145 for focusing the spectral image 230 onto the imaging sensor 145. Those skilled in the art will appreciate that the collimating lens module 151 and the condenser lens module 152 can be readily designed according to knowledge in the art and practical requirements in handling the output light line 220 and the spectral image 230.

Figure 6:
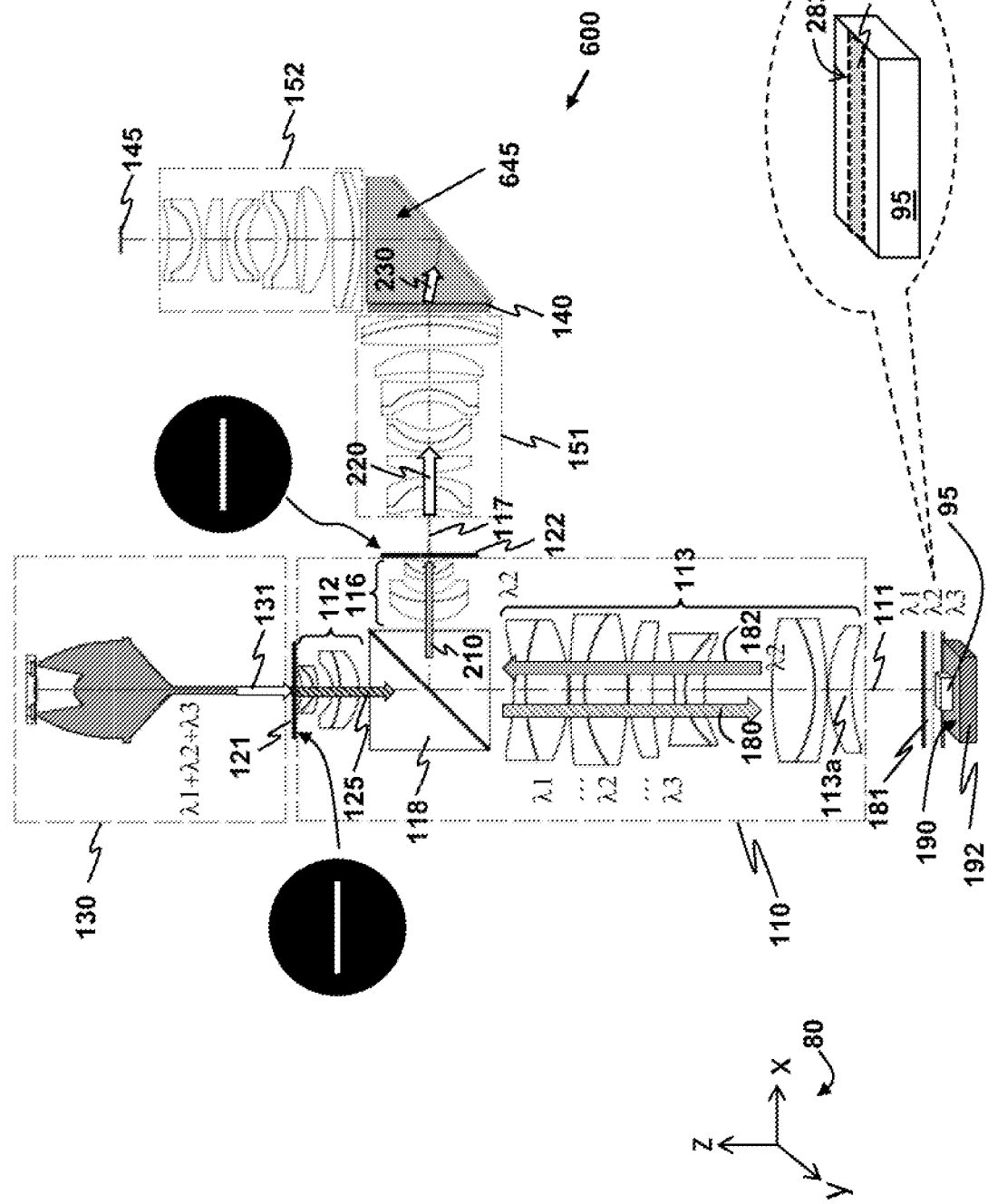
FIG. 6 depicts a second line-scanning 3D sensing system for measuring a surface profile of an object, where the second system includes a prism for changing a direction of a spectral image of the output light line so as to enable convenient alignment and assembling of a collimating lens module and a condenser lens module in the second system.

FIG. 6 depicts a second line-scanning 3D sensing system 600 (shorthanded as a second system 600) for measuring a surface profile of an object 95 in accordance with certain embodiments of the disclosed line-scanning 3D sensing system.

The second system 600 is realized by any of the embodiments of the first system 100 and further comprises a prism 645 for reflecting the spectral image 230 emitted from the grating 140 to the condenser lens module 152. The prism 645 is configured to redirect the spectral image 230 such that the collimating lens module 151 and the condenser lens module 152 are oriented perpendicularly to each other. In the first system 100, on the other hand, the condenser lens module 152 is required to make a predetermined angle of θ with the second optical axis 117 in order to receive the spectral image 230 from the grating 140. Hence, the second system 600 is advantageous over the first system 100 in that the second system 600 enables convenient alignment and assembling of the collimating lens module 151 and the condenser lens module 152.

Figure 7:
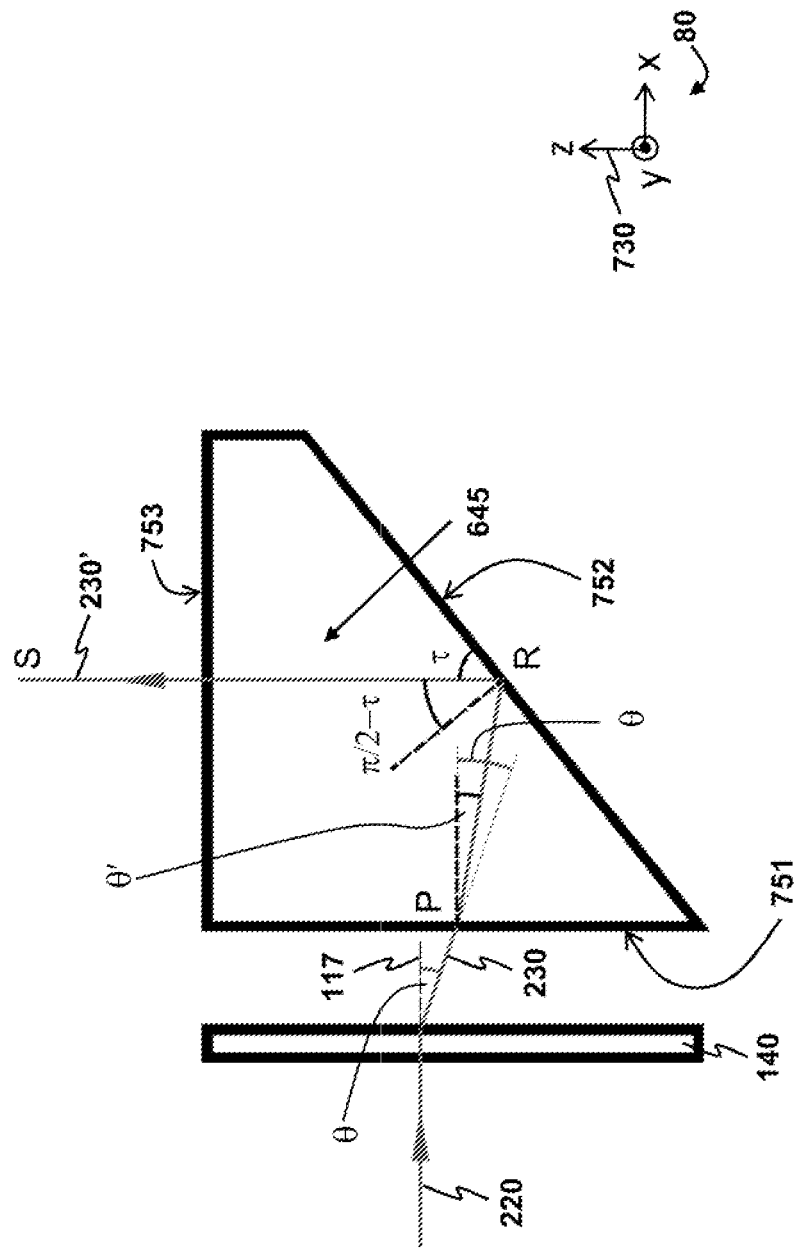
FIG. 7 depicts an enlarged diagram of the prism used in the second system.

FIG. 7 depicts an enlarged diagram of the prism 645 for illustrating a design thereof. The prism 645 includes a first surface 751, a slant surface 752 and a second surface 753. The first surface 751 is positioned adjacent to the grating 140 for receiving the spectral image 230. The spectral image 230 is reflected by the slant surface 752 by means of TIR. The second surface 753 is positioned adjacent to the condenser lens module 152. The reflected spectral image 230' perpendicularly exits the second surface 753 to enter into the condenser lens module 152. In addition, a possible additional advantage of using the prism 645 is that it may correct the image field curvature distortion due to the tilting diffraction angle.

To design the prism 645, one is required to determine a tilting angle τ between the slant surface 752 and a z-direction 730 with respect to the reference frame 80. The z-direction 730 is perpendicular to the second surface 753. The tilting angle τ is determined as follows. Form Snell's law, one has that sin θ=n sin θ' where: n is the refractive index of the prism material; θ, which is the diffraction angle of the grating 140, is also an angle of incidence of the spectral image 230 entering into the prism 645; and θ' is the corresponding angle of refraction. From the geometry of the prism 645, since the incidence angle is the same as the reflection angle for TIR at the slant surface 752, one gets π/2+θ'=2τ. Hence, the tilting angle τ is given by $$\tau = \frac{1}{2}\left[\frac{\pi}{2} + \sin^{-1}\left(\frac{\sin\theta}{n}\right)\right].$$

Figure 8:
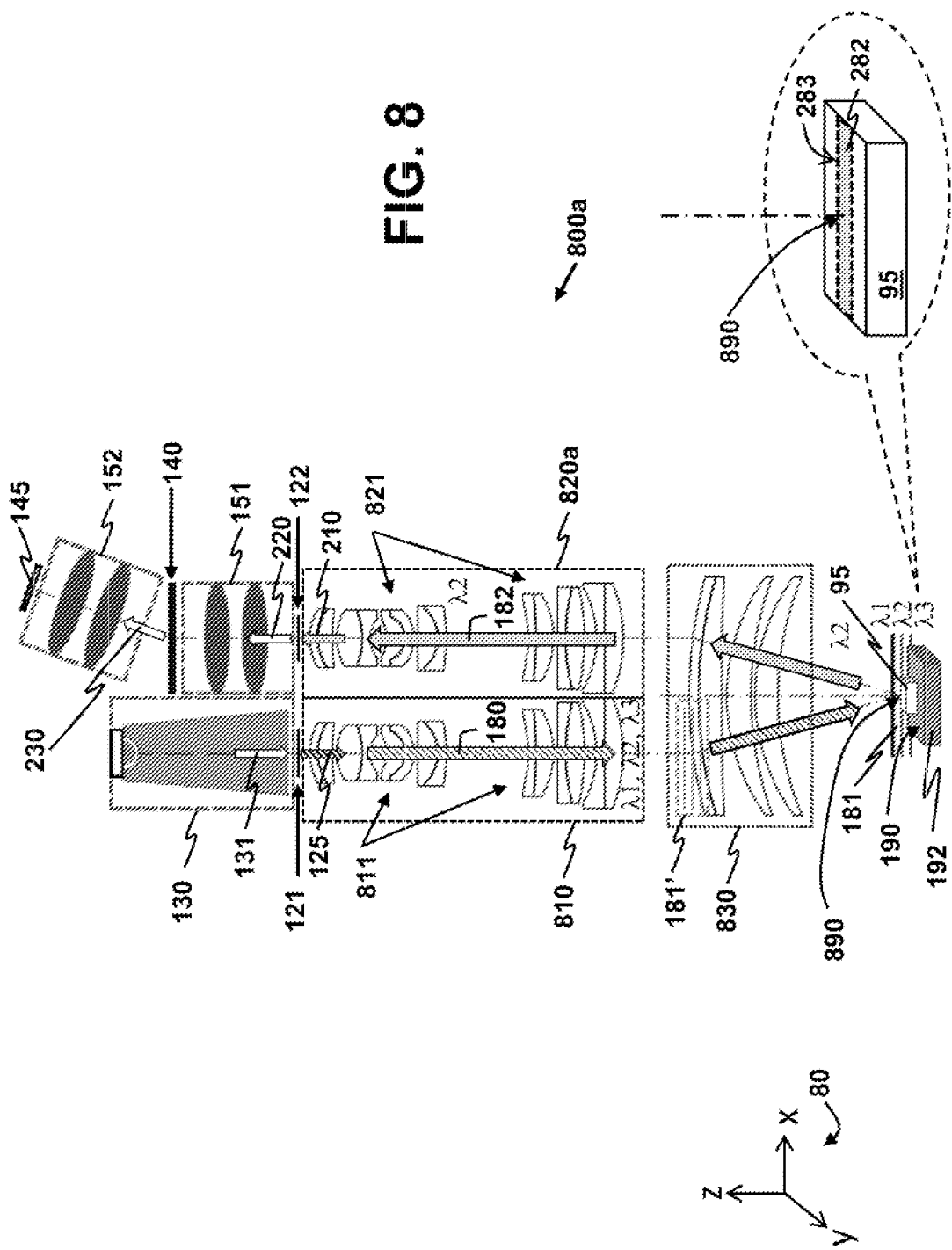
FIG. 8 depicts a third line-scanning 3D sensing system for measuring a surface profile of an object, where the third system uses two separate DOMs to generate the rainbow light pattern and optically condense the captured IBCI.

FIG. 8 depicts a third line-scanning 3D sensing system 800a (shorthanded as a third system 800a) for measuring a surface profile of an object 95 in accordance with certain embodiments of the disclosed line-scanning 3D sensing system. The main feature of the third system 800a against the first system 100 is that instead of using one DOM in simultaneously generating the rainbow light pattern 181 and processing the IBCI 182, two DOMs are respectively used to perform these two functions.

The third system 800a is developed based on the first system 100, and comprises the light source module 130, the first slit 121, and the second slit 122. Details of the light source module 130, first slit 121, and second slit 122 are disclosed above for the first system 100. The third system 800a further comprises a first DOM 810, a second DOM 820a and a bi-passed lens module 830.

The light source module 130 is used for generating the polychromatic light beam 131.

The first slit 121 is optically coupled to the light source module 130 for spatially filtering the polychromatic light beam 131 to form the PLLB 125.

The first DOM 810 is configured to perform a forward optical process of chromatically dispersing the PLLB 125 received from the first slit 121 into CNLLBs 180 and focusing the CNLLBs 180 on different focal planes to form a rainbow light pattern 181'. The rainbow light pattern 181', when meeting the object 95, is used for illuminating a scanned surface 283 of the object 95 during surface profile measurement so as to cause the illuminated object 95 to display an IBCI 282 on the object 95. The IBCI 282 contains height information of the scanned surface 283. Note that the rainbow light pattern 181', which is generated by the first DOM 810, is located on a position not meeting the object 95.

The second DOM 820a is configured to capture the IBCI 282 and to perform a backward optical process of optically condensing the captured IBCI 182 to an elongated light pattern 210. The backward optical process is an inverse of the forward optical process. Note that the first and second DOMs 810, 820a are positioned side by side.

The bi-passed lens module 830 is optically coupled to the first DOM 810, the object 95 and the second DOM 820a. In particular, the bi-passed lens module 830 comprises a plurality of lenses 831 configured to reposition the rainbow light pattern 181' generated by the first DOM 810 to an offset position 890 at which the object 95 is arranged to position such that the repositioned rainbow light pattern 181 meets the object 95. The plurality of lenses 831 is further configured to direct the IBCI 282 from the offset position 890 to the second DOM 820a for enabling the second DOM 820a to capture the IBCI 282.

The second slit 122 is used for spatially filtering the elongated light pattern 210 to form an output light line 220. A height profile of the scanned surface 283 is obtainable by analyzing a spectral content at each point of the output light line 220 such that the surface profile is determinable according to respective height profiles obtained for a plurality of scanned surfaces of the object 95.

Note that the first DOM 810 and the second DOM 820a are configured to perform the forward and backward optical processes, respectively, as mentioned above, where the backward optical process is an inverse of the forward optical process. Usually, the first DOM 810 and the second DOM 820a are realized with a first plurality of lenses 811 and a second plurality of lenses 821, respectively, where the second plurality of lenses 821 is a replica of the first plurality of lenses 811.

Similar to the first system 100, the third system 800a may comprise the grating 140 and the imaging sensor 145. The grating 140 is used for diffracting the output light line 220 to thereby form the spectral image 230. The spectral image 230 is obtained as a first-order diffraction pattern of the output light line 220. The imaging sensor 145 is a 2D imaging sensor used for imaging the spectral image 230. The imaging sensor 145 is positioned at an orientation of θ with respect to the second optical axis 117 for imaging the first-order diffraction pattern, which is the spectral image 230. The spectral content at each point of the output light line 220 is determinable from the spectral image 230. The third system 800a may further comprise the collimating lens module 151 and the condenser lens module 152. The collimating lens module 151 is positioned between the second slit 122 and the grating 140 for collimating the output light line 220 before the output light line 220 is diffracted by the grating 140. The condenser lens module 152 is positioned between the grating 140 and the imaging sensor 145 for focusing the spectral image 230 onto the imaging sensor 145.

Similar to the first system 100, the light source module 130 of the third system 800a may be a color-mixing light source module. The light source module 130 of the third system 800a may be realized as any of the embodiments of the first color-mixing light source module 130a or of the second color-mixing light source module 130b.

Figure 9:
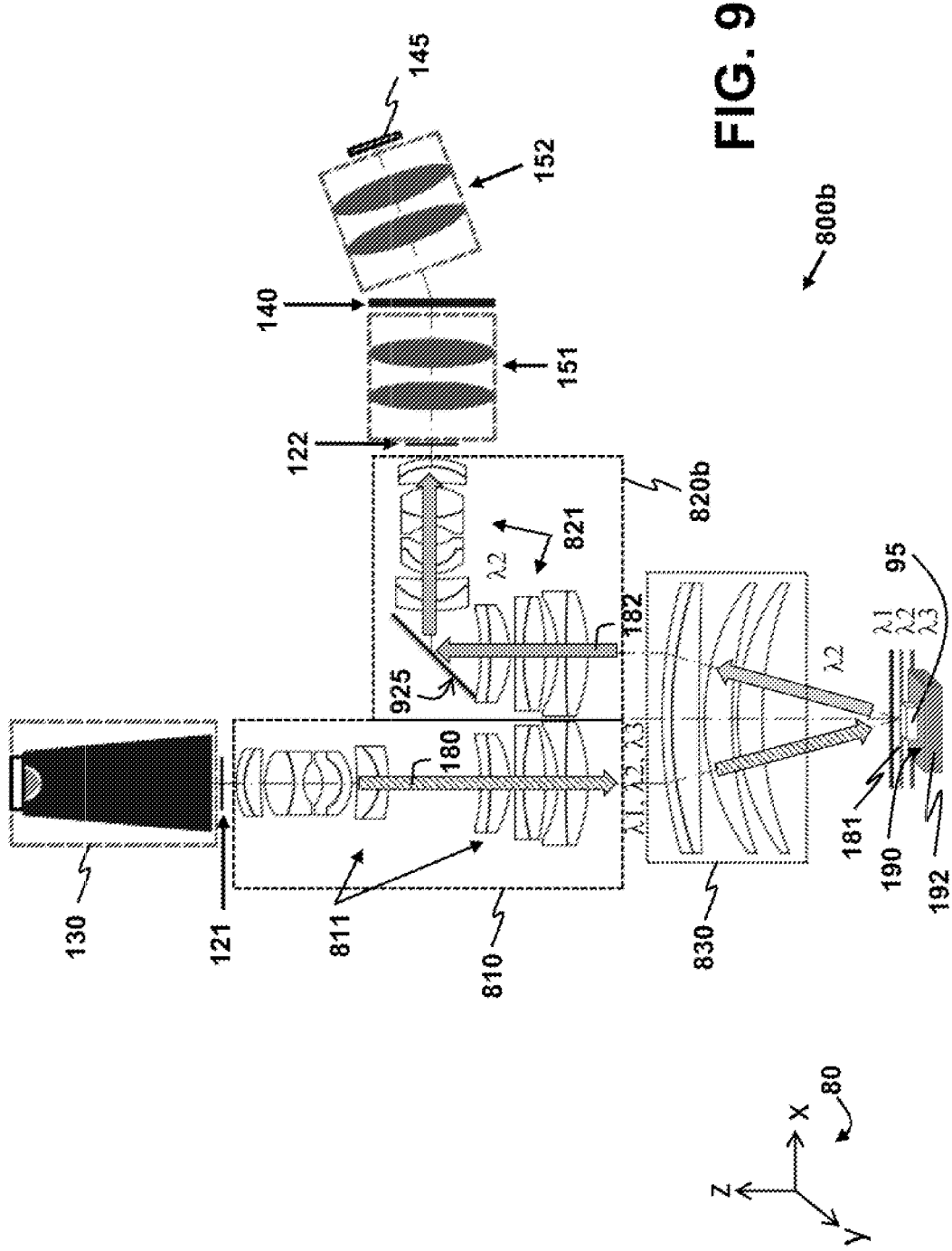
FIG. 9 depicts a fourth line-scanning 3D sensing system for measuring a surface profile of an object, where the fourth system is a variant of the third system with an advantage of moving an imaging sensor and a condenser lens module away from a light source module so as to avoid difficulty in assembling the condenser lens module to the fourth system as well as to avoid interference to the imaging sensor due to possible light leakage from the light source module.

FIG. 9 depicts a fourth line-scanning 3D sensing system 800b (shorthanded as a fourth system 800b) for measuring a surface profile of an object 95 in accordance with certain embodiments of the disclosed line-scanning 3D sensing system. The fourth system 800b is a variant of the third system 800a. It is first noted that in the third system 800a, the imaging sensor 145 is close to the light source module 130 and the condenser lens module 152 is rigidly tilted by a diffraction angle for receiving the spectral image 230. It may lead to difficulty in assembling the condenser lens module 152 to the third system 800a as well as in avoiding interference to the imaging sensor 145 due to possible light leakage from the light source module 130. The fourth system 800b advantageously moves the imaging sensor 145 and the condenser lens module 152 away from the light source module 130.

The fourth system 800b is realized by any of the embodiments of the third system 800a except that a modification to the second DOM 820a is made. A second DOM 820b as modified and used in the fourth system 800b is implemented with the second plurality of lenses 821 as in the original second DOM 820a. Additionally, the second DOM 820b is further installed with a reflector 925 positioned in the second plurality of lenses 821 for reflecting the captured IBCI 182 such that a pathway of the captured IBCI 182 in the second DOM 820b is changed in direction by a certain angle, preferably by 90°. As a result, the imaging sensor 145 and the condenser lens module 152 are moved away from the light source module 130.

Figure 10:
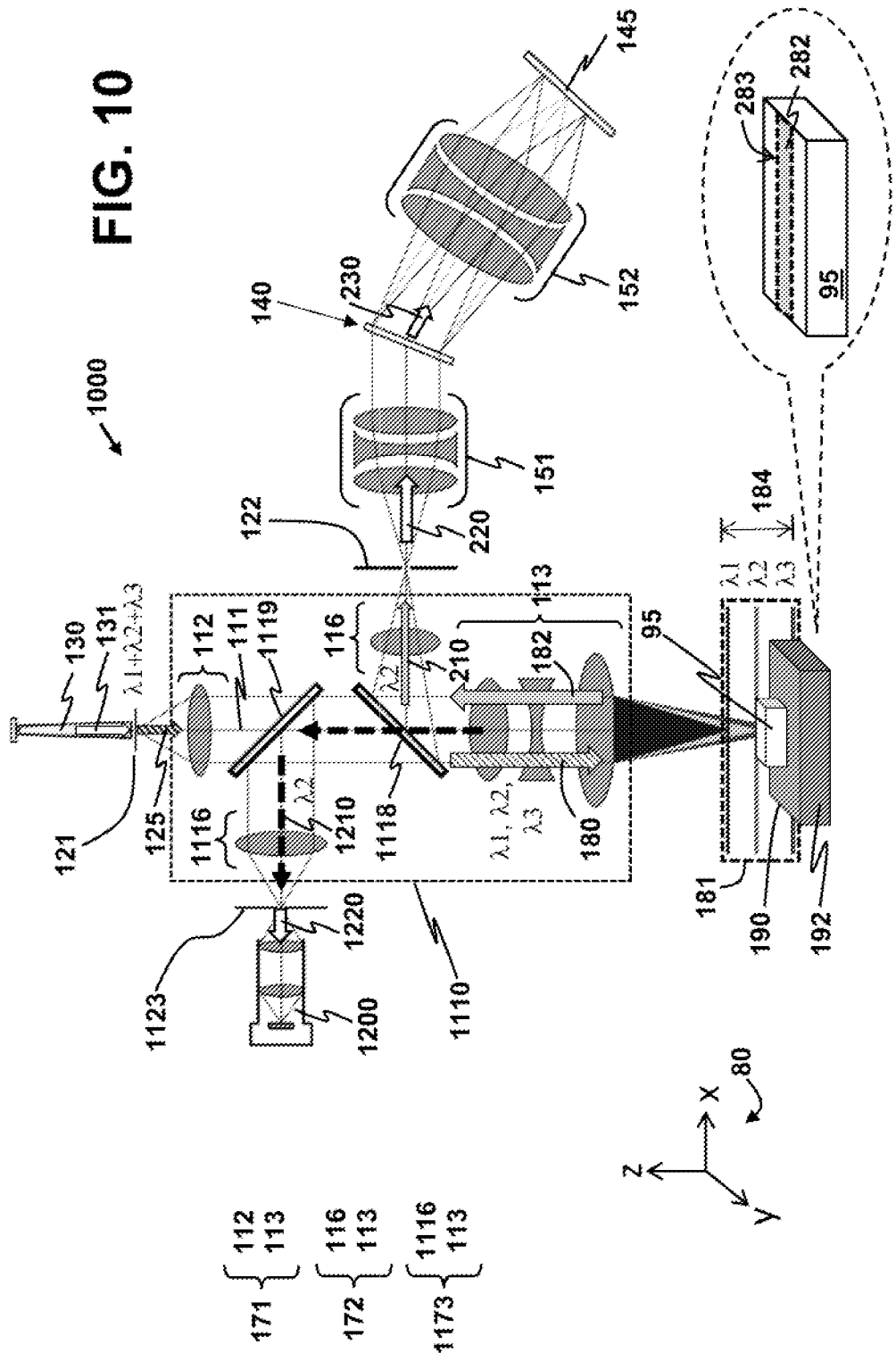
FIG. 10 depicts a fifth line-scanning 3D sensing system for measuring a surface profile of an object, where the fifth system has an additional functionality of taking a 2D image of the object.

FIG. 10 depicts a fifth line-scanning 3D sensing system 1000 (shorthanded as a fifth system 1000) for measuring a surface profile of an object 95 in accordance with certain embodiments of the disclosed line-scanning 3D sensing system. The fifth system 1000 is developed based on the first system 100 with an additional functionality of taking a 2D image of the object 95.

The fifth system 1000 is realized by any of the embodiments of the first system 100 except that a modification to the DOM 110 is made and additional elements related to taking the 2D image are introduced.

The additional elements include a third slit 1123 and a 2D line-scanning camera 1200. The third slit 1123 is used for spatially filtering a copy 1210 of the elongated light pattern received at the third slit 1123 to form a second output light line 1220. The 2D line-scanning camera 1200 is used for imaging the second output light line 1220 in color. The 2D image of the object 95 is obtainable after the plurality of scanned surfaces is scanned for 3D sensing.

A DOM 1110 as modified and used in the fifth system 1000 comprises a plurality of lenses 112, 113, 116, 1116 used for realizing the forward and backward optical processes and outputting a certain signal for making the 2D image. Particularly, the DOM 1110 comprises a first group of lenses 171, a second group of lenses 172 and a third group of lenses 1173, where lenses in these three groups are selected from the plurality of lenses 112, 113, 116, 1116. As shown in FIG. 10, the first lens group 171 consists of lenses 112, 113, the second lens group 172 consists of lenses 113, 116, and the third lens group 1173 consists of lenses 113, 1116. Note that the three lens groups 171, 172, 1173 share one or more lenses (referred to as commonly-shared lenses 113). The lenses 112, 113 of the first lens group 171 are aligned on a first optical axis 111. The first lens group 171 is configured to chromatically disperse the PLLB 125 into the CNLLBs 180 and focus the CNLLBs 180 respectively on the focal planes 183a-c distributed on the first optical axis 111 over the predetermined length 184 to form the rainbow light pattern 181. The second lens group 172 is configured to optically condense the captured IBCI 182 to form the elongated light pattern 210. The third lens group 1173 is configured to deliver the elongated light pattern copy 1210, which is substantially similar to the elongated light pattern 210 received at the second slit 122, to the third slit 1123.

Since both the CNLLBs 180 and the captured IBCI 182 travel in the commonly-shared lenses 113, it is required to separate the captured IBCI 182 from the CNLLBs 180 before the captured IBCI 182 (which becomes the elongated light pattern 210) reaches the second slit 122 as well as before the captured IBCI 182 (which becomes the elongated light pattern copy 1210) reaches the third slit 1123. As such, the DOM 1110 further comprises a first beam splitter 1118 and a second beam splitter 1119. The first beam splitter 1118 is optically coupled to the commonly-shared lenses 113 and positioned in the first lens group 171 such that the captured IBCI 182 traveling in the commonly-shared lenses 113 is duplicated into two copies, one of which is directed towards the second slit 122. Similarly, the second beam splitter 1119 is optically coupled to the commonly-shared lenses 113 and positioned in the first lens group 171 such that the captured IBCI 182 traveling in the commonly-shared lenses 113 is duplicated into two copies, one of which is directed towards the third slit 1123.

Based on the analysis made above for the first system 100, those skilled in the art will appreciate that: the lenses 116 disposed between the first beam splitter 1118 and the second slit 122 may be selected to be replicas of the lenses 112 (referred to as corresponding lenses 112) disposed between the second beam splitter 1119 and the first slit 121; and the lenses 1116 disposed between the second beam splitter 1119 and the third slit 1123 may also be selected to be replicas of the corresponding lenses 112.

Some remarks applicable to all the embodiments of the present invention, including the first, second, third, fourth and fifth systems 100, 600, 800a, 800b, 1000, are given as follows.

In the present invention, all the CNLLBs 180 for forming the rainbow light pattern 181 may be visible or invisible, so that the entire rainbow light pattern 181 may be visible (if, for instance, a sheet of paper is used as a screen to visualize the rainbow light pattern 181) or may be invisible. Using a visible rainbow light pattern has a practical advantage that setting up and fine tuning the disclosed line-scanning 3D sensing system by human personnel is made easy. On the other hand, if it is preferred not to arouse nearby people's attention during the surface profile measurement, an invisible rainbow light pattern (e.g., based on NIR) is useful. The present invention also encompasses the case that some of the CNLLBs 180 are invisible.

Since the backward optical process is the inverse of the forward optical process, the main central line 215 of the elongated light pattern 210 has a size close to the size of the PLLB 125. Those skilled in the art will appreciate that scaling up or down the size of the elongated light pattern 210 produced by a certain DOM does not change the operating principle of the disclosed line-scanning 3D sensing system in surface profile measurement. Those skilled in the art will be able to modify the disclosed embodiments without material difficulty to effect this scaling step according to the teachings disclosed herein in the specification and accompanied drawings. A scaled backward optical process is obtained as the backward optical process cascaded with a multiplication block of scaling the size of the elongated light pattern 210. In view of the foregoing discussion, the scaled backward optical process is regarded equivalent to the backward optical process within the scope of the invention.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A line-scanning three-dimensional (3D) sensing system for measuring a surface profile of an object, the system comprising:
    a light source module for generating a polychromatic light beam, wherein the light source module is a color-mixing light source module comprising:
        a light source for generating raw light rays that collectively provide polychromatic light; and
        a color mixing rod optically coupled to the first slit to provide the polychromatic light beam to the first slit for spatial filtering, the color mixing rod being shaped as an elongated slab for mixing the raw light rays to generate the polychromatic light beam such that at least a portion of the polychromatic light beam to be received by the first slit is substantially uniform in color;
    a first slit for spatially filtering the polychromatic light beam to form a polychromatic linear light beam (PLLB);
    a dispersion optical module (DOM) configured to:
        perform a forward optical process of chromatically dispersing the PLLB received from the first slit into constituent narrowband linear light beams (CNLLBs) and focusing the CNLLBs respectively on different focal planes to form a rainbow light pattern for illuminating a scanned surface of the object during surface profile measurement, whereby the illuminated object is caused to display an information-bearing color image (IBCI) on the object, the IBCI containing height information of the scanned surface;
        capture the IBCI; and
        perform a backward optical process of optically condensing the captured IBCI to form an elongated light pattern, wherein the backward optical process is an inverse of the forward optical process; and
    a second slit for spatially filtering the elongated light pattern to form an output light line, whereby a height profile of the scanned surface is obtainable by analyzing a spectral content at each point of the output light line such that the surface profile is determinable according to respective height profiles obtained for a plurality of scanned surfaces of the object.

2. The system of claim 1, wherein the DOM comprises:
    a first group of lenses aligned on a first optical axis, the first group of lenses being configured to chromatically disperse the PLLB into the CNLLBs and focus the CNLLBs respectively on the different focal planes distributed on the first optical axis over a predetermined length to form the rainbow light pattern; and
    a second group of lenses configured to optically condense the captured IBCI to form the elongated light pattern, wherein the first and second groups of lenses share one or more commonly-shared lenses, at least one commonly-shared lens being used for simultaneously outputting the rainbow light pattern and inputting the IBCI, thereby avoiding a burden of aligning the first and second groups of lenses to output the rainbow light pattern and input the IBCI.

3. The system of claim 2 further comprising:
    a third slit for spatially filtering a copy of the elongated light pattern received at the third slit to form a second output light line; and
    a two-dimensional (2D) line-scanning camera for imaging the second output light line in color, whereby a 2D image of the object is obtainable after the plurality of scanned surfaces is scanned for 3D sensing;
    wherein the DOM further comprises:
    a first beam splitter positioned in the first group of lenses such that the captured IBCI is duplicated into two copies, one of which is directed towards the second slit; and
    a second beam splitter positioned in the first group of lenses such that the captured IBCI is duplicated into two copies, one of which is directed towards the third slit.

4. The system of claim 3 further comprising:
    a grating for diffracting the output light line to thereby form a spectral image of the output light line;
    an imaging sensor for imaging the spectral image, the spectral content at each point of the output light line being determinable from the spectral image;
    a collimating lens module positioned between the second slit and the grating for collimating the output light line before the output light line is diffracted by the grating; and
    a condenser lens module positioned between the grating and the imaging sensor for focusing the spectral image onto the imaging sensor.

5. The system of claim 2, wherein the DOM further comprises a beam splitter optically coupled to the one or more commonly-shared lenses and positioned in the first group of lenses such that the captured IBCI is duplicated into two copies, one of which is directed towards the second slit.

6. The system of claim 5, wherein the second group of lenses includes one or more additional lenses not shared with the first group of lenses, the one or more additional lenses being disposed between the beam splitter and the second slit for optically processing the captured IBCI before the captured IBCI reaches the second slit, wherein the one or more additional lenses are replicas of corresponding one or more lenses used in the first group of lenses for optically processing the PLLB and disposed between the beam splitter and the first slit.

7. The system of claim 2, wherein:
the first slit is configured such that the PLLB emitted at any point on the first slit into the DOM has a first group of chief rays having an angle of divergence within 1° as measured from the first optical axis;
the first group of lenses is configured such that the CNLLBs received at any point on the rainbow light pattern has a second group of chief rays having an angle of convergence within 1° as measured from the first optical axis;
the system further comprises a platform for positioning the object during surface profile measurement, the platform comprising a reference plane on which the object is arranged to be positioned; and
the first group of lenses is oriented such that the first optical axis is perpendicular to the reference plane, causing the rainbow light pattern to be perpendicular to the reference plane to thereby allow the surface profile to be measured even if the scanned surface includes a trough.

8. The system of claim 1, wherein:
the light source comprises one or more light emitting diodes (LEDs) for collectively generating the raw light rays; and
the color-mixing light source module further comprises an asymmetric total-internal-reflection (TIR) lens for orienting the raw light rays generated from the one or more LEDs toward the color mixing rod, wherein the asymmetric TIR lens has different lengths in x- and y-directions.

9. The system of claim 1, wherein:
the light source comprises one or more light emitting diodes (LEDs) each deposited with a sun spectrum phosphor padding, the sun spectrum phosphor padding being formulated for generating a spectrum of light at least over a range of 400 nm to 700 nm, the one or more LEDs being arranged to optically excite the sun spectrum phosphor padding to generate the raw light rays that collectively provide the polychromatic light; and
the color mixing rod is optically coupled to the light source for directly receiving the raw light rays from the light source.

10. The system of claim 1 further comprising:
a grating for diffracting the output light line to thereby form a spectral image of the output light line;
an imaging sensor for imaging the spectral image, the spectral content at each point of the output light line being determinable from the spectral image;
a collimating lens module positioned between the second slit and the grating for collimating the output light line before the output light line is diffracted by the grating; and
a condenser lens module positioned between the grating and the imaging sensor for focusing the spectral image onto the imaging sensor.

11. The system of claim 10 further comprising:
a prism for reflecting the spectral image emitted from the grating to the condenser lens module, the prism being configured to redirect the spectral image such that the collimating lens module and the condenser lens module are oriented mutually perpendicularly to each other to thereby enable convenient alignment and assembling of the collimating lens module and the condenser lens module.

12. A line-scanning three-dimensional (3D) sensing system for measuring a surface profile of an object, the system comprising:
a light source module for generating a polychromatic light beam;
a first slit optically coupled to the light source module for spatially filtering the polychromatic light beam to form a polychromatic linear light beam (PLLB);
a first dispersion optical module (DOM) configured to perform a forward optical process of chromatically dispersing the PLLB received from the first slit into constituent narrowband linear light beams (CNLLBs) and focusing the CNLLBs on different focal planes to form a rainbow light pattern, the rainbow light pattern being used for illuminating a scanned surface of the object during surface profile measurement so as to cause the illuminated object to display an IBCI on the object, the IBCI containing height information of the scanned surface;
a second DOM configured to capture the IBCI and to perform a backward optical process of optically condensing the captured IBCI to an elongated light pattern, wherein the backward optical process is an inverse of the forward optical process, and the first and second DOMs are positioned side by side;
a bi-passed lens module configured to reposition the rainbow light pattern generated by the first DOM to an offset position at which the object is arranged to position, and to direct the IBCI from the offset position to the second DOM for enabling the second DOM to capture the IBCI; and
a second slit for spatially filtering the elongated light pattern to form an output light line, whereby a height profile of the scanned surface is obtainable by analyzing a spectral content at each point of the output light line such that the surface profile is determinable according to respective height profiles obtained for a plurality of scanned surfaces of the object.

13. The system of claim 12, wherein:
the first DOM comprises a first plurality of lenses; and
the second DOM comprises a second plurality of lenses, wherein the second plurality of lenses is a replica of the first plurality of lenses.

14. The system of claim 13, wherein the second DOM further comprises a reflector positioned in the second plurality of lenses.

15. The system of claim 12, wherein the light source module is a color-mixing light source module comprising:
a light source for generating raw light rays that collectively provide polychromatic light; and
a color mixing rod optically coupled to the first slit to provide the polychromatic light beam to the first slit for spatial filtering, the color mixing rod being shaped as an elongated slab for mixing the raw light rays to generate the polychromatic light beam such that at least a portion of the polychromatic light beam to be received by the first slit is substantially uniform in color.

16. The system of claim 15, wherein:
the light source comprises one or more light emitting diodes (LEDs) for collectively generating the raw light rays; and
the color-mixing light source module further comprises an asymmetric total-internal-reflection (TIR) lens for mixing the raw light rays generated from the one or more LEDs to form an intermediate light output such that the intermediate light output is substantially uniform in radiation power, the raw light rays in the intermediate light output being fed to the color mixing rod, wherein the asymmetric TIR lens has different lengths in x- and y-directions.

17. The system of claim 15, wherein:

the light source comprises one or more light emitting diodes (LEDs) each deposited with a sun spectrum phosphor padding, the sun spectrum phosphor padding being formulated for generating a spectrum of light at least over a range of 400 nm to 700 nm, the one or more LEDs being arranged to optically excite the sun spectrum phosphor padding to generate the raw light rays that collectively provide the polychromatic light; and the color mixing rod is optically coupled to the light source for directly receiving the raw light rays from the light source.

18. The system of claim 12 further comprising:

a grating for diffracting the output light line to thereby form a spectral image of the output light line;

an imaging sensor for imaging the spectral image, the spectral content at each point of the output light line being determinable from the spectral image;

a collimating lens module positioned between the second slit and the grating for collimating the output light line before the output light line is diffracted by the 'grating; and a condenser lens module positioned between the grating and the imaging sensor for focusing the spectral image onto the imaging sensor.

19. A line-scanning three-dimensional (3D) sensing system for measuring a surface profile of an object, the system comprising:

a light source module for generating a polychromatic light beam;

a first slit for spatially filtering the polychromatic light beam to form a polychromatic linear light beam (PLLB);

a dispersion optical module (DOM) configured to:

perform a forward optical process of chromatically dispersing the PLLB received from the first slit into constituent narrowband linear light beams (CNLLBs) and focusing the CNLLBs respectively on different focal planes to form a rainbow light pattern for illuminating a scanned surface of the object during surface profile measurement, whereby the illuminated object is caused to display an information-bearing color image (IBCI) on the object, the IBCI containing height information of the scanned surface;

capture the IBCI; and perform a backward optical process of optically condensing the captured IBCI to form an elongated light pattern, wherein the backward optical process is an inverse of the forward optical process;

a second slit for spatially filtering the elongated light pattern to form an output light line, whereby a height profile of the scanned surface is obtainable by analyzing a spectral content at each point of the output light line such that the surface profile is determinable according to respective height profiles obtained for a plurality of scanned surfaces of the object;

a grating for diffracting the output light line to thereby form a spectral image of the output light line;

an imaging sensor for imaging the spectral image, the spectral content at each point of the output light line being determinable from the spectral image;

a collimating lens module positioned between the second slit and the grating for collimating the output light line before the output light line is diffracted by the grating;

a condenser lens module positioned between the grating and the imaging sensor for focusing the spectral image onto the imaging sensor; and a prism for reflecting the spectral image emitted from the grating to the condenser lens module, the prism being configured to redirect the spectral image such that the collimating lens module and the condenser lens module are oriented mutually perpendicularly to each other to thereby enable convenient alignment and assembling of the collimating lens module and the condenser lens module.

* * * * *